(12) United States Patent
Dorton (10) Patent No.: US 10,442,155 B2
(45) Date of Patent: Oct. 15, 2019

(54) CONSTRUCTS FOR DISTRIBUTION OF FILL MATERIAL

(71) Applicant: The North Face Apparel Corp., Wilmington, DE (US)

(72) Inventor: Jeffrey Allen Dorton, Dublin, CA (US)

(73) Assignee: The North Face Apparel Corp., Wilmington, DE (US)

( * ) Notice: Subject to any disclaimer, the term of this patent is extended or adjusted under 35 U.S.C. 154(b) by 117 days.

(21) Appl. No.: 15/524,997

(22) PCT Filed: Nov. 5, 2015

(86) PCT No.: PCT/US2015/059195
§ 371 (c)(1),
(2) Date: May 5, 2017

(87) PCT Pub. No.: WO2016/073691
PCT Pub. Date: May 12, 2016

(65) Prior Publication Data
US 2018/0179678 A1  Jun. 28, 2018

Related U.S. Application Data

(60) Provisional application No. 62/076,890, filed on Nov. 7, 2014.

(51) Int. Cl.
*B32B 5/02* (2006.01)
*B32B 1/02* (2006.01)
(Continued)

(52) U.S. Cl.
CPC .................. *B32B 5/02* (2013.01); *B32B 1/02* (2013.01); *B32B 5/00* (2013.01); *B32B 5/022* (2013.01);
(Continued)

(58) Field of Classification Search
CPC .... B32B 1/02; B32B 5/00; B32B 5/02; B32B 5/022; B32B 5/024; B32B 5/026; B32B 7/04; B32B 7/05; B32B 7/08
See application file for complete search history.

(56) References Cited

U.S. PATENT DOCUMENTS 4,418,116 A   11/1983   Scott
4,426,945 A    1/1984   A-Yan
(Continued)

FOREIGN PATENT DOCUMENTS

CN    102529199     7/2012
JP    2000070098    3/2000
(Continued)

OTHER PUBLICATIONS

Japanese Office Action with English Machine Translation for JP Application No. 2017-524374, dated Aug. 1, 2018, 11 pages.
(Continued)

*Primary Examiner* — Walter Aughenbaugh
(74) *Attorney, Agent, or Firm* — Ganz Pollard, LLC (57) ABSTRACT

In some embodiments, the inventive subject matter is directed to an arrangement of discrete elements of fill material on a substrate consisting of a sheet material wherein the discrete elements are fixed relative to the sheet material by pilings, fusion, and/or entanglement to fix the insulating elements in a layered arrangement over the sheet material. A second sheet of material may be used to create a sandwiched assembly of the discrete elements. In some embodiments, the inventive subject matter is generally directed to discrete elements of fill material that are engaged together to form a cohesive sheet-like or layered arrangement of the elements.

20 Claims, 7 Drawing Sheets

(51) Int. Cl.
  *B32B 7/05* (2019.01)
  *B32B 5/00* (2006.01)
  *B32B 7/08* (2019.01)
  *B32B 7/04* (2019.01)
  *D04H 1/52* (2006.01)
  *D04H 3/115* (2012.01)
  *D04H 5/06* (2006.01)
  *D04H 1/55* (2012.01)

(52) U.S. Cl.
  CPC .............. *B32B 5/024* (2013.01); *B32B 5/026* (2013.01); *B32B 7/04* (2013.01); *B32B 7/05* (2019.01); *B32B 7/08* (2013.01); *D04H 1/52* (2013.01); *D04H 1/55* (2013.01); *D04H 3/115* (2013.01); *D04H 5/06* (2013.01); *B32B 2437/00* (2013.01); *B32B 2471/04* (2013.01); *B32B 2601/00* (2013.01); *D10B 2501/04* (2013.01); *D10B 2503/00* (2013.01)

(56) References Cited

U.S. PATENT DOCUMENTS

| | | | |
|---|---|---|---|
| 4,481,247 A | 11/1984 | Tesch | |
| 4,879,169 A | 11/1989 | Zafiroglu | |
| 4,917,943 A | 4/1990 | Tesch | |
| 5,286,556 A | 2/1994 | Tesch | |
| 5,329,868 A | 7/1994 | Tesch | |
| 5,987,669 A | 11/1999 | Leggett et al. | |
| 6,613,431 B1 | 9/2003 | Rumiesz et al. | |
| 8,578,516 B2 * | 11/2013 | Li | A47G 9/086 2/97 |
| 2016/0355958 A1 | 12/2016 | Grynaeus et al. | |

FOREIGN PATENT DOCUMENTS

| | | |
|---|---|---|
| JP | 200929219 | 2/2009 |
| KR | 88-0000289 | 3/1988 |
| TW | 150394 B | 1/1991 |
| WO | 2014143071 | 9/2014 |

OTHER PUBLICATIONS

Office Action for Taiwanese Application No. 104136654, dated Mar. 17, 2017, "Summary" written in English is p. 1 of 13-page document. Only thing that is in English.
International Search Report and Written Opinion for International Application No. PCT/US2015/59195, dated Apr. 1, 2016.
Extended European Search Report for European Application No. 15857530, dated Nov. 26, 2018, 10 pages.
Chinese Office Action in Chinese Application No. 201580072799.8, dated Nov. 1, 2018, 12 pages.
Non-Final Rejection with English Translation in Korean Application No. 10-2017-7014983, dated Apr. 10, 2018, 18 pages.
Second Office Action with English Machine Translation in Japanese Application No. 2017524374, dated Apr. 23, 2019, 8 pages.

* cited by examiner

CONSTRUCTS FOR DISTRIBUTION OF FILL MATERIAL

RELATED APPLICATIONS

This application claims the benefit of and priority to U.S. Provisional Application Ser. No. 62/076,890, filed Nov. 7, 2014, the contents of which are hereby incorporated by reference as if recited in full herein for all purposes.

BACKGROUND

The inventive subject matter relates generally to constructs that have one or more sheets of material associated with the clusters of fiber elements. In some embodiments, it relates to constructs wherein compartments are defined by spaced-apart sheets of textile materials, and the assembly is configured to restrict movement and clumping of the fiber clusters to help maintain the clusters in a generally uniform distribution within the compartment. More particularly, the inventive subject matter is directed to constructs for thermal insulation or padding, such as those used in outerwear garments, sleeping bags, comforters, pillows, pads, upholstery, etc.

Figure 1:
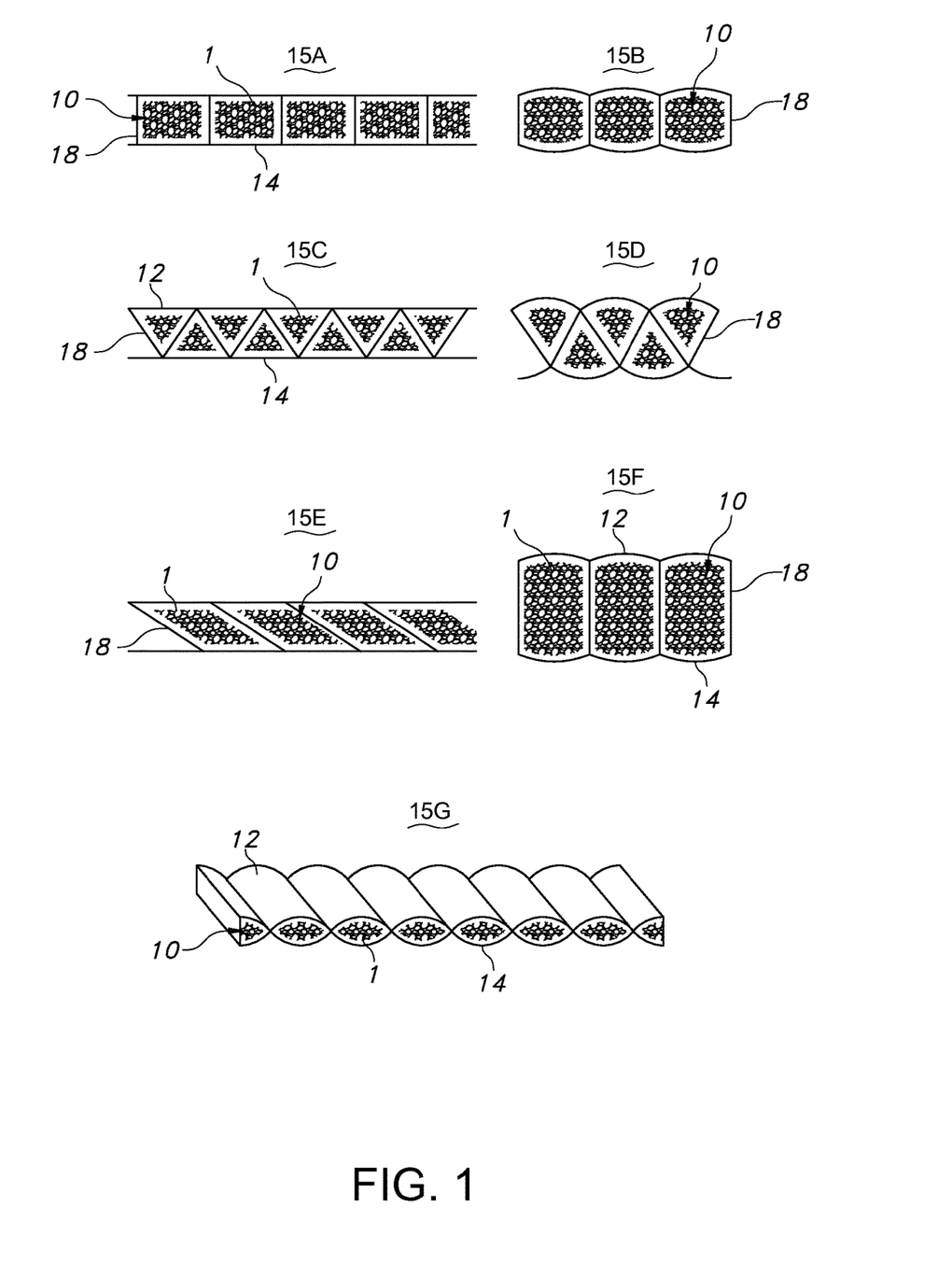
FIG. 1 shows sectional views of representative compartments into which a fill material may be placed, as known in the prior art.

In the construction of insulated and cushioned articles, fill material 1 is often compartmentalized in a structure that contains the fill. A compartment 10 may be an individual baffle in any of many known baffled constructions 15A-15G, some examples of which are shown in FIG. 1. Many different articles incorporate baffled constructions, including outer garments, sleeping bags, and comforters. The fill material 1 used in such items provide thermal insulation. Therefore, uniform distribution of the fill material in a baffle or other compartment is important for preventing thermal breaks. Some articles may hold fill material in a single compartment rather than a plurality of compartments. For example, pillows and cushions or pad for furniture may hold fill in a single compartment. Even in these examples, uniform distribution of fill material is important so that there is uniform cushioning and appearance.

Down is a desirable fill material for its thermal insulative and cushioning properties. However, it has many drawbacks, including its expensiveness, lack of performance when wet, and controversiality with respect to animal welfare. There have been advances at developing synthetic downs. One example is U.S. Application No. 61/991,309, now WO2015/153477, which is hereby incorporated by reference in its entirety and under common ownership with this application. Other commercially available fill material is sold under the PrimaLoft™ brand. Like natural down, synthetic fill material comprises discrete elements consisting of short primary fibers, which may have secondary fibers branching off. The discrete fibers can clump together in small ball-like clusters, particularly during washing. Unfortunately, even when contained in baffles, the clumping of the fibers may result in overly large clusters. When this happens, the desirable uniform fill in a baffle or other compartment is lost, resulting in thermal breaks or inconsistent cushioning.

Manufacturing processes for products made of down and similar, loose synthetic fill are not as efficient or cost effective as the processes for products that are purely textile based.

Figure 2:
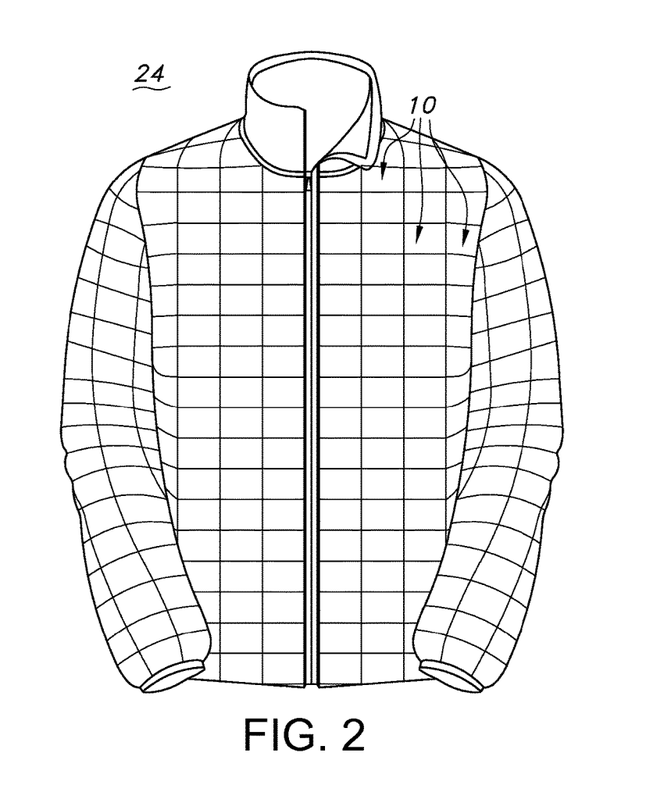
FIG. 2 shows a representative article that incorporates a plurality of constructs made according to the inventive subject matter.

Modern textile products, such as apparel products, are produced in a relatively efficient line production. However, products that are assembled with down or other loose fill material must be pulled off the production line and taken to an area where the fill material is blown into pillow or bag-like compartments that hold the down. Initially, the compartment is relatively large and not baffled. The blowing process does not uniformly distribute the fill material in the initial compartment. Production workers must pat down the compartment to uniformly distribute the down. Once that is done, the compartment is subdivided into many smaller, baffled compartments, as seen in FIG. 2, for example, which hold the fill material in a uniform distribution. These steps, which are off the main production line, involve extra time and expense.

In view of the foregoing issues, there is a need for improved products and components thereof that incorporate or associate with fill materials, as well as for more efficient and lower cost manufacturing methods.

SUMMARY

The inventive subject matter overcomes the disadvantage of the prior art by providing a construct that helps maintain a uniform distribution of fill material through normal use and washing. The construct is inexpensive and supports the use of synthetic-down fill materials. It allows for efficient manufacturing processes, such as conveyor systems, and rolling systems for spooling or rolling of the inventive constructs, while avoiding the disadvantages of inefficient, stepwise down filling processes.

In some embodiments, the inventive subject matter is directed to an arrangement of discrete elements of fill material on a substrate consisting of a sheet material wherein the discrete elements are fixed relative to the sheet material by pilings, fusion, and/or entanglement to fix the insulating elements in a layered arrangement over the sheet material. A second sheet of material may be used to create a sandwiched assembly of the discrete elements. A given sheet material can be a single ply of a material. Or it can be multiple plies of the same or different material, which act as a unitary sheet structure. A given sheet material can also have homogeneous or heterogeneous properties over its surface areas. For example, areas can be zoned for breathability, waterproofness, insulativeness, comfort, wear resistance, etc. Properties on one surface of a sheet material may be different from those on an opposite surface.

In some embodiments, the inventive subject matter is generally directed to discrete elements of fill material that are engaged together to form a cohesive sheet-like or layered arrangement of the elements.

In some embodiments, the inventive subject matter is generally directed to a construct that has discrete elements of fill material distributed over a surface of sheet material in a desired manner, e.g., a uniform manner.

In other embodiments the inventive subject matter is directed to a construct consisting of a first wall spaced-apart and opposite to a second wall, the space between the walls providing a volume for receiving a loose fill material. A plurality of piles are disposed between the walls and project into the volume, each having a first end fixedly associated with the first wall and/or a second end fixedly associated with the second wall. The piles are transversely oriented to the walls. A loose fill material consisting of discrete elements is disposed in the volume around the piles. The walls may each be a layer of a textile material. The piles may be threads, fibers, yarns or other flexible filamentous structures.

Advantageously, the construct may be produced as continuous a length of pliable sheet material that may be spooled into rolls and used as any textile material would be in textile-products production lines. Thus, the construct provides a ready-to-use layer of fill material, eliminating the need for off-production line blowing and other processing of fill material.

These and other embodiments are described in more detail in the following detailed descriptions and the figures.

The foregoing is not intended to be an exhaustive list of embodiments and features of the inventive subject matter. Persons skilled in the art are capable of appreciating other embodiments and features from the following detailed description in conjunction with the drawings.

The following is a description of various inventive lines under the inventive subject matter. The appended claims, as originally filed in this document, or as subsequently amended, are hereby incorporated into this Summary section as if written directly in.

BRIEF DESCRIPTION OF THE DRAWINGS

The appended figures show embodiments according to the inventive subject matter, unless noted as showing prior art. The Figures are not necessarily to scale and may be schematic illustrations meant to convey concepts rather than manufacturing specifications.

DETAILED DESCRIPTION

Representative embodiments according to, or usable with, the inventive subject matter are shown in FIGS. 2-9D, wherein the same or generally similar features share common reference numerals.

In some aspects, the inventive subject matter is generally directed to various embodiments of a construct that has discrete elements of fill material distributed over a surface of sheet material in a desired manner, e.g., a uniform manner.

In some possible embodiments, the inventive subject matter is generally directed to a construct for helping to maintain a uniform or other desired distribution of discrete elements of fill material 1 in a compartment or on a single sheet of material. The inventive subject matter generally achieves this by distributing a plurality of spaced-apart piles projecting into the volume of the compartment or over a single sheet of material. The piles engage the fill material and restrict its movement helping to maintain a uniform distribution of the elements of fill material and breakup clumping. The construct may be incorporated into an item of apparel, a sleeping bag, a comforter, a pillow, or a pad or cushion, for example.

In certain embodiments, the discrete elements of fill material each consist of an agglomeration of fibers. The fibers can be entangled or otherwise agglomerated together, which provides a fiber network characterized by fibers crossing each other, with the degree of cross-over creating a level of openness or porosity in each discrete element. The discrete elements are analogous to cotton balls: The fibers in the structure may have free ends or extending sections that are disposed over the exterior of the discrete element; and these ends or sections can engage, e.g., crossover or overlap, similar fiber section in adjacent discrete elements or other fiber-based structures.

The overall agglomeration of fibers in a discrete element can have a variety of general volumetric forms, including spheroid, ellipsoid and cuboid three-dimensional forms. The fibers in a given discrete element may be of a homogeneous or heterogeneous nature. For example, fibers used in a discrete element may be blended to provide varying attributes, including any one or more of the following: dimensional variation (e.g., length, diameter or other cross-sectional dimension); shape variation (e.g., linear, curving, branching (e.g., primary, secondary or tertiary structure)); and material property variation (e.g., melting point, glass transition point; hydrophobicity or hydrophilicity, elasticity, hardness, tensile strength, denier, etc.) Methods of forming discrete elements such as ball-like clusters for entangled fibers are well known. For example, U.S. Pat. No. 6,613,431, which is hereby incorporated by reference in its entirety, discloses constructs and methods of forming ball-like clusters of fibers. The method of manufacturing involves a variation of a carding operation. However, such an operation is modified so that rather than forming a web, fiber balls are formed.

In one possible embodiment, the inventive subject matter is directed to a construct comprising a sheet material 12 having a first wall or surface spaced-apart and a second, opposite sheet of material 14 having a second wall or surface. The space between the walls provides a volume 13 for receiving a loose fill material 1. The volume may also be defined by perimeter walls 18 that transversely connect to the opposing layers to form an enclosed compartment, as in the case of a rectilinear or cylinder volumetric space. In other cases, the longitudinal cross section through the first and second walls may be, for example, spherical or ovoid and not have distinct perimeter walls (e.g., assembly 15G in FIG. 1).

Figure 3:
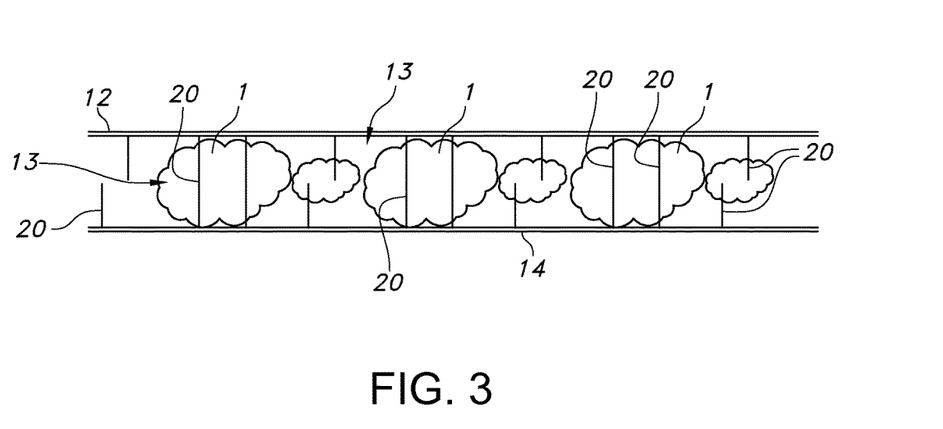
FIG. 3 shows a sectional view of a representative compartment with piles for helping to maintain a uniform distribution of fill material.
Figure 4:
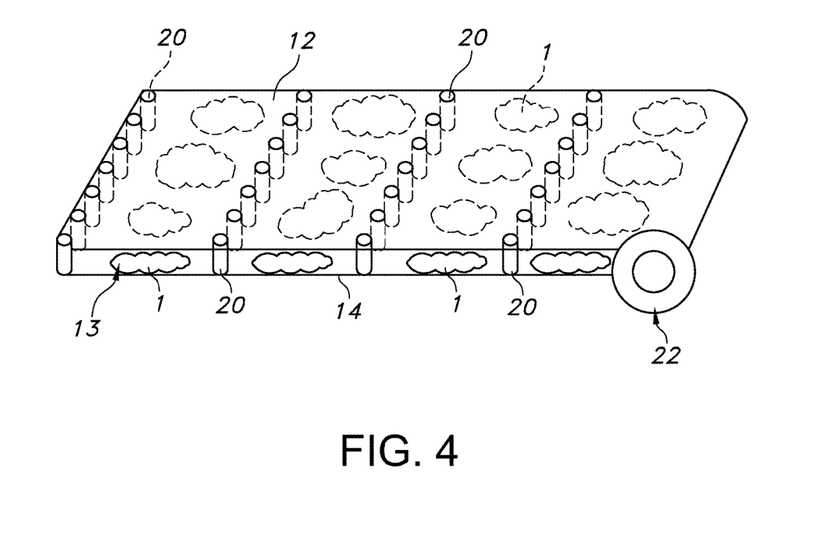
FIG. 4 shows an example of a construct consisting of a continuous length of a pliable material, with a portion being in a rolled form.

The discrete elements 1 of fill material may be disposed over a surface of a sheet material in one or more layers or levels. For example, FIGS. 3-4 show discrete elements 1 in a single level, and FIGS. 5-8 show discrete elements 1 stacked in multiple levels. Any sheet of base material may have discrete elements disposed over one or both sides. The elements may be disposed over some or all the surface of the sheet material. The elements may be disposed in any kind of desired pattern or shape over some or all a given surface of sheet material. For example, the elements may be disposed in rows, checker board patterns, concentric circles. A surface area covered with discrete elements may have any shape, including squares, rectangles, polygons, circles, ovals, etc., and combinations for shapes.

A plurality of flexible piles 20 project from one or both walls. The piles may be fibers, threads, yarns, or other filaments. In the embodiments of FIGS. 3-4, they extend from a wall partially or fully through the compartment space and are transversely oriented to the walls. The volume defined by the walls of the first and second walls and perimeter walls (if any) can have any desired volumetric shape. For example, the volume could be based on: polyhedrons, e.g., squares, rectangles, triangle, trapezoids; spheres; ovals; cone; complex curves; etc. A loose fill material comprising discrete elements 1 is disposed in the volume around the piles. The piles engage the fill material so as to restrict its movement and prevent clumping. Accordingly, the configuration of the construct helps to maintain a uniform distribution of the fill material in the compartment.

The piles may engage the fill material in any one or more ways to restrict movement. The spacing of the piles (i.e., number per square or cubic centimeter) may be such that they mechanically interfere with movement of the fill material, helping to keep the material in place. The piles may serve as physical barriers or entangling structures, for instance. The diameter or thickness of the piles may be such that they further help engage fill material. The pile may have any desired cross-section to help block movement. For example they are not limited to round cross sections but could have cross sections where one dimension is substantially wider than another, e.g., rectangular. In some embodiments, the piles do not have smooth or uniform outer surfaces but include secondary structures such as hook or loop elements that can catch fill material, similar to the effect of hook and loop fasteners. In other embodiments, the piles could have an adhesive surface that removably or permanently bonds to fill material.

In other embodiments, the piles 20 may extend from a sheet of material, e.g., sheet 12, and through discrete elements of fill material 1 so as to anchor the elements to the surface of a sheet of material. The piles may optionally extend through the elements of fill material to an opposing second sheet of material 14 to create a construct wherein the fill material is anchored and to and compartmentalized between the two sheets of material As indicated above, the piles do not need to span from one wall to the other. They may extend partially into the volume so that a free end is in the compartment's space and not connected to the wall that is opposite the one from which it extends. Or piles may extend fully through the compartment. Or they may be a mix of partially and fully extending piles, as seen in FIG. 3. If the piles extend fully through the space, one end of the pile may be connected to a wall and the other end may rest in the opposing wall or be connected to it. The piles need extend only for such length that they can alone, or in combination with piles on an opposite wall, block or otherwise engage the fill material to help immobilize it.

The piles 20 may be isolated elements or part of a continuous string of material that crosses back and forth from one wall to another. In the latter case, segments of the string have ends connected to the opposing walls 12, 14. The piles may be formed in separated groups. In some possible applications, the piles are uniformly distributed over a construct, as seen in FIG. 4. But variations are possible. For example, a lower density distribution might be possible in a region where fill material elements are larger or denser. Another region could have a different, finer fill material that requires a higher density of piles to provide sufficient immobilization of the fill material. Accordingly, the inventive subject matter contemplates that a given construct may have a plurality of regions, each with piles of unique attributes, e.g., density, distribution or pattern, material type, material structure. The inventive subject matter also contemplates that a given construct may have a plurality of regions, each with fill material of unique attributes, e.g., density, material type, or material structure.

In one possible embodiment, the wall structures are woven, knitted or non-woven textile structures that are subject to a punching process that punches wall material into the space of the compartment, forming structures 20. The punching process may be based on needles, air jets, or water jets, as known in the art. In another possibility, the threads, yarns, or other filaments may be joined to the wall structures via stitching, sewing, knitting, or weaving into the space of a compartment. For any application, suitable thread or filament deniers for the piles may be of any desired value. For many applications, they will be at least 1 denier per filament (DPF). They may be fusible, thermoplastic elements that are fusion bonded into place, e.g., to a wall, across walls, and/or to from one or both walls to the elements of fill material.

The piles may also be formed of semi-rigid or rigid structures, such as plastics, that are preferably, resiliently deformable FIG. 3 shows a representative example of a construct 10. The construct has a first wall 12 spaced-apart and opposite to a wall 14, the volumetric space 16 between the walls providing a volume for receiving a loose fill material 1. As seen, the walls are generally parallel to each other in this example. A plurality of flexible piles 20, each having a first end 20A fixedly associated with the first wall and a second end 20B associated with the wall, the piles being transversely oriented to the walls 12, 14. Other piles have only one end on a wall 12 or 14 and the other end is free in the space between the walls. As seen in FIG. 3, the piles are oriented generally perpendicular to the first and second walls in this example. However, in other embodiments they may be at various angles. They may or may not contact each other in points of crossover or abutment.

The loose fill material, which may be clusters of discrete elements, is disposed in the volume around the piles 20. For example, the fill material may be natural goose down or a synthetic fill, such as PrimaLoft™ synthetic fiberfill material, which is available from PrimaLoft, Inc., Latham, N.Y., USA (http://www.primaloft.com). An example PrimaLoft™ synthetic fill can be a nepped water repellent polyester staple fiber of a rounded structure having an average diameter of 3.5 mm or thereabout and a diameter in the range of 1.0 mm to 6.0 mm or thereabout. The fill power for such a product is between 350-400 FP when tested according to industry test standard EN 12130. Unlike traditional continuous filament synthetic insulations, the small, round fibers of PrimaLoft™ fill closely mimic down clusters, trapping heat within small air pockets to retain warmth. Notably, the individual clusters made of smaller units of fill material may themselves also be considered discrete elements 20. For many applications contemplated herein, such as apparel, sleeping bags, comforters and pillows, the first and second walls 12, 14 of construct 10 are pliable layers of a sheet material. For example, the pliable layers may be a textile material. For some applications, it is desirable for the layers to be made of a lightweight fabric. Examples of lightweight fabrics include scrim and taffeta fabrics. In other applications, the layers can be heavier fabrics for durable outdoor use, such a ballistic or Cordura™ Nylon or ripstop Nylon.

In other applications, the pliable layer may be a waterproof breathable membrane, such as expanded PTFE (sold under, e.g., the brand name GoreTex™) or a microporous polyurethane.

A construct may be subdivided to consist of a plurality of integrated baffles, as shown in FIGS. 1-2. FIG. 1 shows layers of material 12, 14 that are stitched together to define a plurality of baffled, integrated compartments 15A-15G. Although not shown in FIG. 1, a plurality of non-rigid or rigid flexible piles 20 may be arranged in any of the embodiments of FIG. 1. FIG. 2 shows a plurality of integrally assembled constructs 10 incorporated into a garment, which in this case is a jacket 24. The compartments 10 in FIG. 2 may be like any of those in FIG. 1 and may include a plurality of piles like those of FIG. 3 or as otherwise contemplated herein. The individual compartments 10 may be subdivisions in what was initially an un-subdivided construct.

Figure 5:
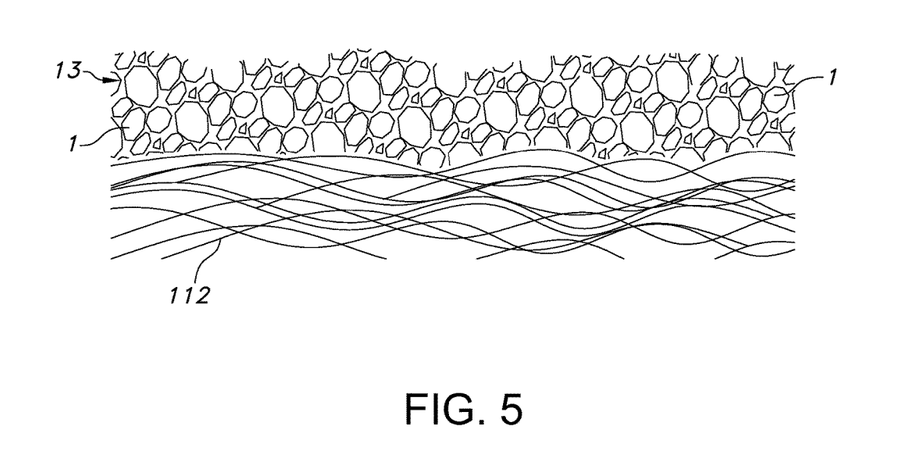
FIG. 5 shows cross-sectional side view of an alternative embodiment of a construct that has discrete elements of fill material distributed over a surface of sheet material in a desired manner.
Figure 6:
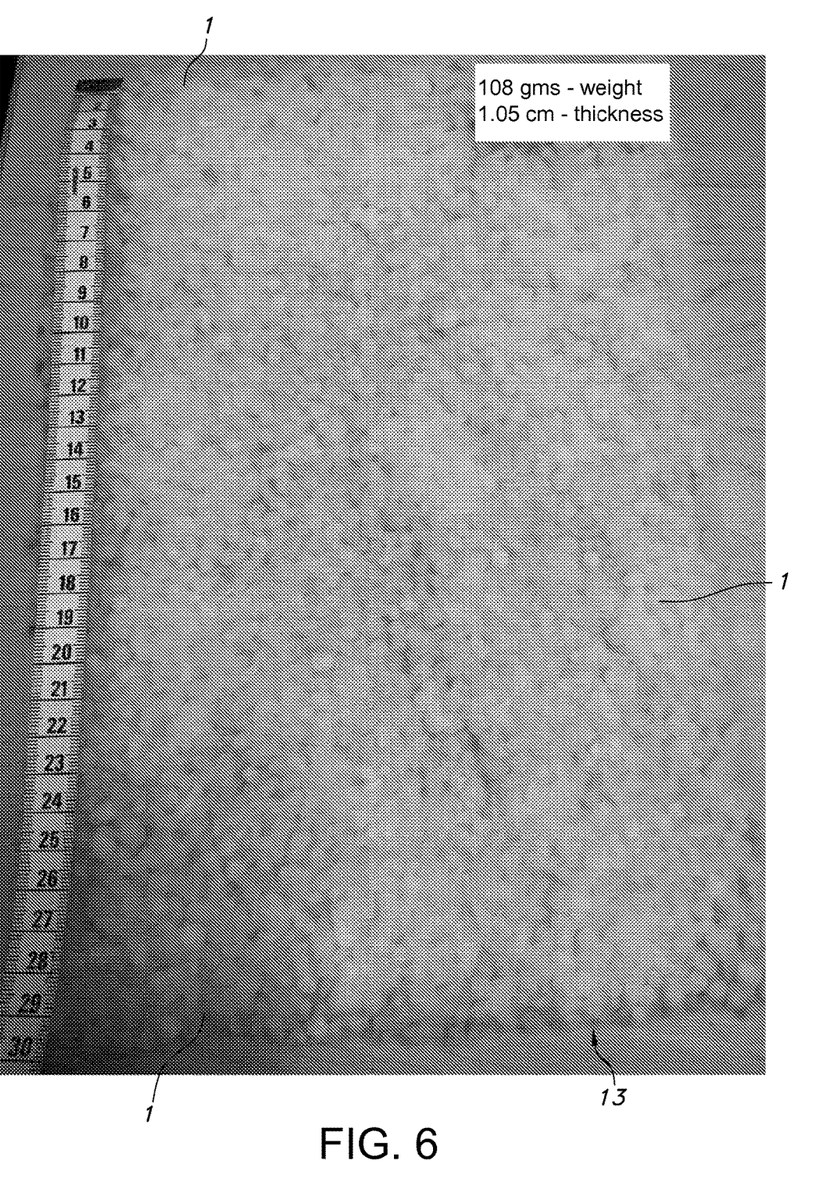
FIG. 6 shows a top surface of the construct of FIG. 5, with the discrete elements disposed over the sheet material.
Figure 7:
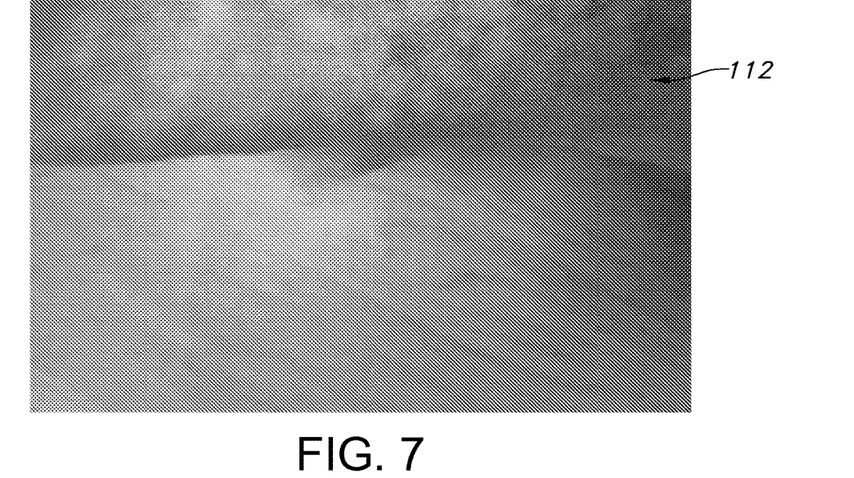
FIG. 7 shows a bottom surface of the construct of FIG. 5, opposite the surface on which the discrete elements are disposed.

In some embodiments, the inventive subject matter is directed to an arrangement of discrete elements of fill material on a surface of a sheet material wherein fibers of the insulating elements are fused with and/or entangled with fibers on the sheet material to fix discrete elements on one or both surfaces of the sheet material over a desired area. FIGS. 5-7 show a representative construct of such nature. In this embodiment, the discrete elements comprise balls of entangled fibers.

In the embodiment of FIGS. 5-7 the discrete elements of fill material 1 are distributed over a surface of sheet material 112 in a desired manner. In this embodiment, a predetermined percentage of fibers in the discrete engage with fibers at the surface of the sheet material. The fibers at the surfaces of adjacent discrete elements may also entangle or otherwise engage with each other. There is sufficient engagement such that the discrete elements are localized relative to the sheet material. The percentage of fibers engaging may be controlled to allow the discrete elements to maintain substantially a discrete element form after they are localized and during normal use in intended applications, such as apparel and sleeping bags.

In general, fusion of fibers can be achieved through thermal processing of fibers to melted or softened conditions. However, chemicals or radiant energy (e.g., UV light) may be similarly used to bond polymer elements together. Fibers can be physically entangled with methods known to persons skilled in the art such as directed needle, water or air based methods. As used herein, "engagement and variations of "engage" means the fibers are sufficiently interconnected by fusion, entanglement or other form of engagement so that the overall structure associated with each part of an interconnected fiber 2A/2B (see discussion below of FIGS. 8 and 9A-D) is sufficiently immobilized for an intended application. Persons skilled in the art can vary the percentage of engaging fibers to determine appropriate percentages for a given application.

By maintaining their discrete form of discrete elements in a localized state, the elements can act like elements of loose fill material without the disadvantage of clumping or bulking up, and leaving areas uninsulated or filled. In one suitable embodiment, the discrete elements retain 50% of their generally volumetric and topological form. In other words, 50% or more of the structure is recognizable and distinct from the general surface of adjacent sheet material and/or adjacent discrete elements. In other embodiments, the discrete elements retain from at least 25%, 30%, 40%, 50%, 60%, 70%, 75%, 80%, 85%, 90%, 91%, 92%, 93%, 94%, 95%, 96%, 97%, 99%, and percentages thereabout such numbers and all ranges of such numbers.

In reference to discrete elements 1, "substantially" means that the discrete elements may undergo changes in dimension or shape as they are localized to each other and/or a sheet material 112 so long as a discrete fiber structure remains in the discrete elements. For example, a discrete element may experience an overall change in dimensions or shapes, e.g., the openness of the fiber network may contract or expand when fused, and/or the geometrical shape of the structure may change, e.g., from a rounder form to an oval form, but still maintaining a network of crossing fibers and a discrete element form.

In another possible embodiment, an additional layer of sheet material may be added over the structure of FIGS. 5-7 to create a sandwiched assembly like that generally shown in FIGS. 3-4.

Figure 8:
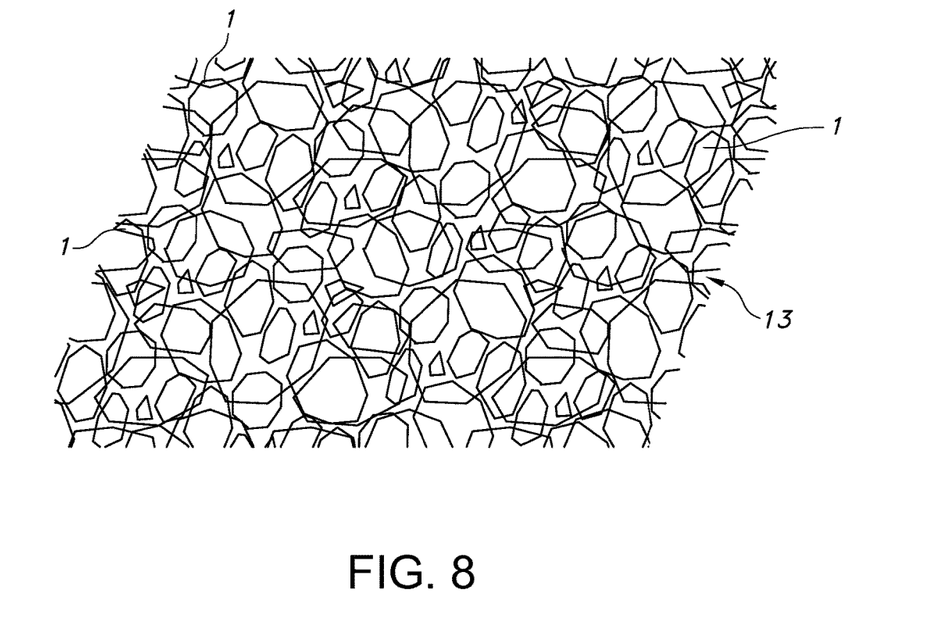
FIG. 8 schematically illustrates a plurality of discrete elements arranged in multiple layers to provide an overall, cohesive sheet structure.
Figure 8A:
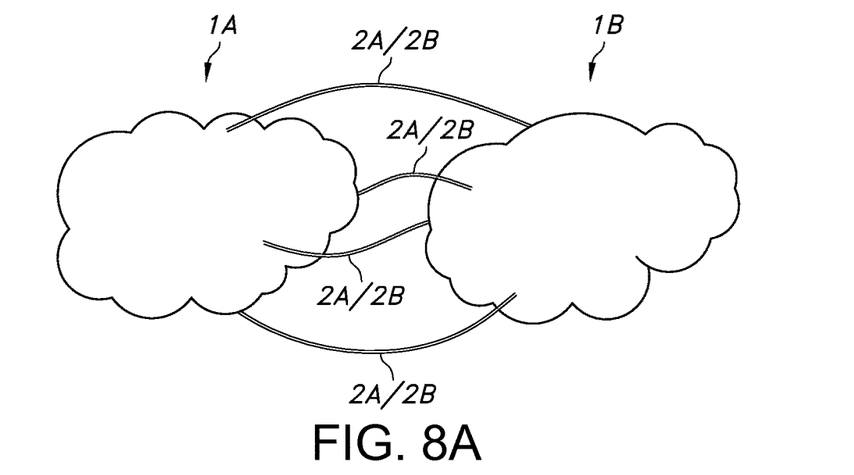
FIG. 8A shows a schematic close up of interconnecting fibers in adjacent discrete elements.
Figure 9A:
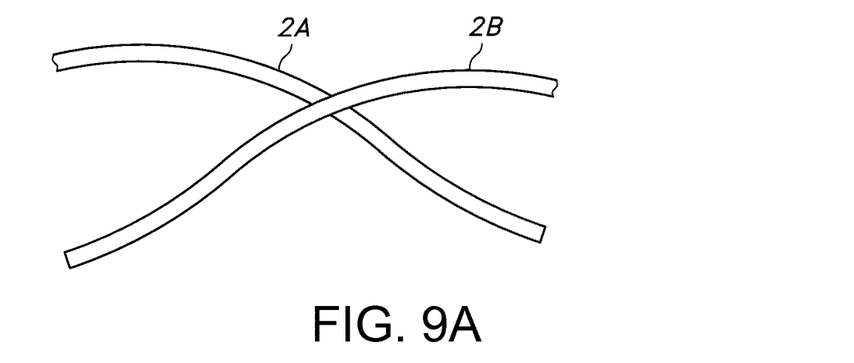
FIGS. 9A-D show examples of isolated lengths of enaging, interconnecting fibers from adjacent discrete elements crossing over or inter-looping with each other.
Figure 9B:
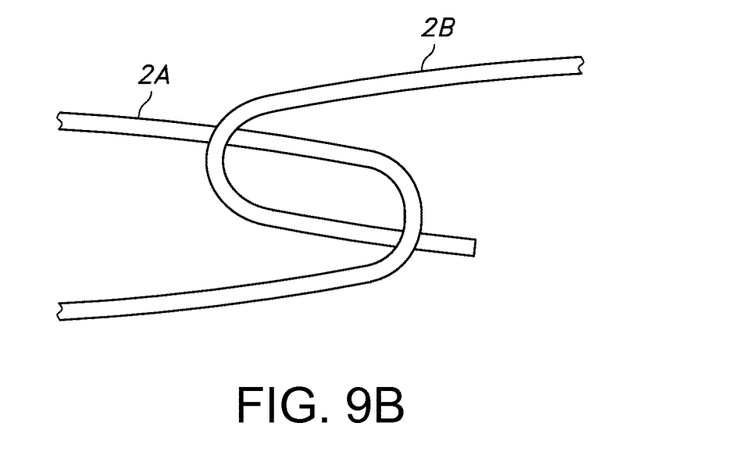
Figure 9C:
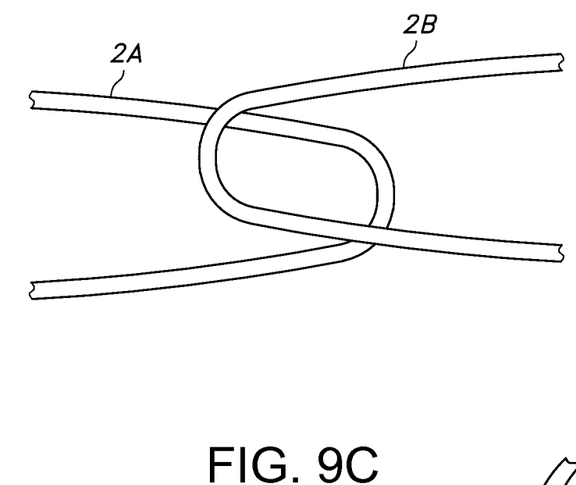
Figure 9D:
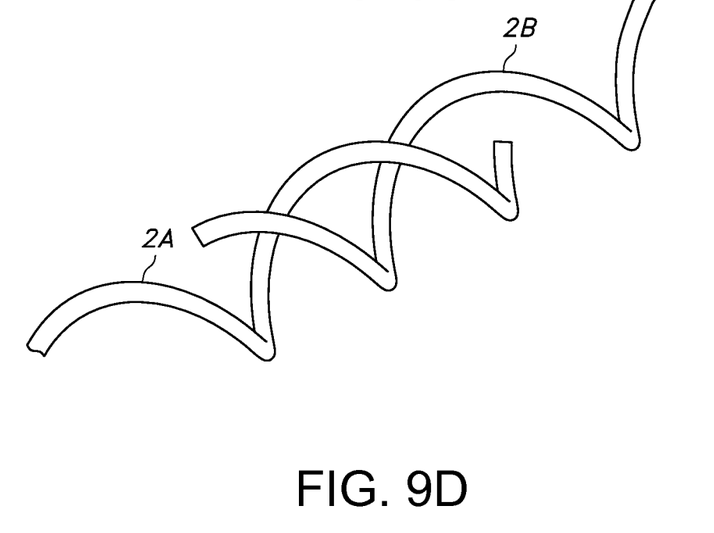

FIG. 8 schematically illustrates a plurality of discrete elements arranged in multiple layers to provide an overall, cohesive sheet structure, which for clarity is isolated from a supporting sheet material, e.g., sheet material 112 or 114. In this embodiment, no sheet material is associated with the discrete elements. Instead, the engagement of fibers in adjacent discrete elements creates a cohesive web structure, with the discrete elements retaining substantially their discrete form in the web, as indicated above. FIG. 8A shows a schematic close up of adjacent discrete elements 1A and 2B and engaging, interconnecting fibers 2A and 2B emanating respectively from elements 1A and 2B. (The illustration is not to scale with respect to, for example, size, shape or spacings; and other fibers agglomerated in each element are not illustrated; and the number of engaging interconnecting fibers may vary considerably.)

The discrete elements in FIG. 8 are adjacent and in neighboring series. In other words, a first given discrete element will have one or more fibers that can contact one or more fibers in one or more adjacent discrete elements. Each of the adjacent discrete elements will have one more fibers that contact one or more fibers in one or more adjacent discrete elements that are not adjacent the first discrete element. Each of these other adjacent discrete elements will in turn have similar relationships with other adjacent discrete elements. Hence all such discrete elements are nodes or bodies that can be serially connected directly or indirectly along the path of interconnecting fibers.

FIGS. 9A-D show examples of isolated lengths of interconnecting fibers 2A, 2B from adjacent discrete elements (e.g., those in FIGS. 8 and 8A), or other fiber-based structures crossing over or inter-looping with each other. As can be understood, the fibers may engage each other at one or more cross-over points. The engagement can be at terminal ends of a fiber or intermediate sections. The fibers may engage by overlapping, crossing-over, or inter-looping, and/or inter-twisting.

The sheet material 12, 14, 112, 114 in any of the embodiments herein may be any desired sheet material. For many applications, the material will be a woven or non-woven textile material. For example, the sheet material may be a woven or non-woven web (e.g., spunbond or meltblown) having a predetermined amount of low-melt fibers among relatively higher melt fibers. Discrete elements of loose fill having a predetermined amount of low melt-fibers are laid on the web. Lengths of fibers from adjacent structures (i.e., discrete element to sheet material) will naturally contact each other, with some percentage of fusible fibers contacting other fibers in an adjacent structure. The assembly of web and discrete elements are heated to fuse the fusible fibers to the other fibers. The other fibers may be fusible fibers that bond together during melting to form an admixture of fused polymer material where fiber lengths overlapped. Or the other fibers may be non-fusible fibers, with the material from melted or softened fusible fibers adhering to the non-fusible fiber after cooling.

Thermal fusing and bonding is an advantage of thermoplastic polymer materials not generally present in yarns, threads, and textiles formed from natural materials (e.g., cotton, silk) and thermoset polymer materials. A thermoplastic polymer material softens or melts when heated and returns to a solid state when cooled. One of the factors affecting the degree of bonding or fusing is temperature and, optionally, pressure. A thermoplastic polymer material transitions from a solid state to (a) a softened state when heated to a glass transition temperature of the thermoplastic polymer material and (b) a generally liquid state when heated to a melting temperature of the thermoplastic polymer material. Thermal bonding may occur when the thermoplastic polymer material is heated to the glass transition temperature. Greater degrees of thermal bonding, as discussed below, may occur at elevated temperatures approaching or exceeding the melting temperature.

As used herein, "fusible" and "non-fusible" are relative terms that mean under a given set of conditions, such as heat, the fusible fibers are capable of transforming to a glass or fluid state and congealing with each other into a film. In contrast, under the same conditions, the non-fusible filaments do not transition significantly to such states, and therefore remain substantially in distinct fiber forms. However, in such forms, the fusible fibers may fusion bond to the non-fusible fibers, as noted above. Further, a non-fusible fiber may be made primarily of non-fusible material but includes a minor portion that fuses for enhanced fusion bonding to another fiber or other substrate. As an example, such a fiber could have a core of non-fusible material and a surrounding sheath of fusible material.

In one possible embodiment suitable for use in sleeping bags and garments, for example, a sheet material in the form of a non-woven web or scrim may be made from fibers of about 0.5 to about 75 Denier. This creates a cohesive base structure for supporting discrete elements that is pliable and not overly stiff for such applications. (Fibers for use in discrete elements or substrates 12 or 14 such as scrims include polyester and various other fiber materials disclosed in detail below.)

For purposes of illustration and not limitation, the following is one possible set of parameters for a construct according to the inventive subject matter. The construct includes a substrate for supporting discrete elements 1 in the nature of a thin, pliable web of non-woven fibers. The web 12 or 14 is about 2-3 mm thick. It is made of 1.4 Denier ("D") fibers, which may include fusible fibers. The web may weigh 15 g to 20 g per square meter. The entire assembly of discrete elements and web may weigh around 100 g per square meter.

The discrete elements may be ball-like clusters of fibers of any type described herein, and the composition may be varied in other embodiments in terms of fiber materials and properties and percentages. The discrete elements have a general diameter of typically 3 mm to 6 mm. The balls are arranged in a cohesive sheet-like structure 13 (e.g., the arrangement of discrete elements 1 seen in FIG. 4, 6 or 8). The structure may weigh 75 to 125 grams per square meter or thereabout in some possible embodiments. As indicated, the foregoing is a non-limiting example, and various other fiber, discrete element and web or other substrate parameters are possible.

In certain embodiments, the discrete elements mimic natural down clusters and may have one or more of, or any combination of the following down and fiber characteristics. As is generally known, down clusters may range from about 5 mm to about 70 mm in diameter. They have a central node or root with many strands extending outwardly in all directions. The individual strands may be referred to as "primary" structures or fibers. A primary structure has many fine structures extending outwardly along its length, which may be referred to as "secondary" structures or fibers. The primary structure has a length of 3 mm to 33 mm, with typical lengths of about 14 mm to 20 mm. A natural down primary structure generally has from 50 to 1500 or thereabout secondary fibers 4 radially disposed along its length. With a length of 33 mm, and a spacing of 60 µm, gives 550 secondaries, or 1100 if you count each side separately. With a length of 3 mm, and a spacing of 60 µm, gives 50 secondaries, or 100, if you count each side separately. Natural down may also have one or two relatively short tertiary fibers spaced along the length of and extending from each secondary fiber 4 per every 100 microns or thereabout.

Natural down's secondary structure lengths generally may range between 0.35 mm to 1.4 mm, with lengths of 0.55 mm to 0.75 mm being typical. The secondary fibers are highly resilient and resistant to permanent deformation, and they are capable of storing elastic energy.

According to the inventive subject matter, the fill material may consist of synthetic down constructs according to PCT/US2015/2337, which is under common ownership with the present application and is hereby incorporated by reference in its entirety for all purposes. The disclosed synthetic down fibers for use in clusters may consist of a composite of a primary fiber and a plurality of coupled secondary fibers that are arranged in a plurality of two- or three-dimensional loops along the length of the primary fiber.

"Fiber", as used herein, is a general term that may mean lengthy filaments in the meter range, short fibers of centimeter or millimeter scale, or fibrils in the micron or nanoscale. Fibers may be monofilaments or a bundle of filaments. Fibers useful in the inventive subject matter may have a range of sizes. Aspect ratios for fibers will generally exceed 10, 15, 20, 30, 40, 50, 60, 70, 80, 90, 100 or more. (Unless otherwise indicated, all measurements of fiber lengths assume that the corresponding dimension is measured by traveling along the path of the applicable structure, For example, if a primary structure has a curving path, the length is measured not in a straight line from one end point to another but by traveling along the curved path. This, of course, is the same distance that would be measured if the curved structure were straightened.)

As used herein, "superfine" fibers means fibers having an average diameter (or other major cross-sectional dimension in the case of non-circular fibers) in the micron scale to nanoscale. As used herein, "micron scale" means the fibers have average diameters in the range of double or single-digit microns to as low as about 1000 nanometers. In the textile industry, nanoscale fibers have average diameters in the range of about 100-1000 nanometers or less). In certain embodiments, superfine fibers and other fibers exhibit a high aspect ratio (length/diameter) of at least 100 or higher. Superfine fibers may be analyzed via any means known to those of skill in the art. For example, Scanning Electron Microscopy (SEM) may be used to measure dimensions of a given fiber.

In some possible embodiments, the primary fibers, which may or may not have secondary or higher order structures, may have a diameter of from about 10 μm-100 μm. For the primary fibers, diameters equal to or less than about 90 μm, 80 μm, 70 μm, 60 μm, 50 μm, 40 μm, 30 μm, 20 μm, or 15 μm, are contemplated. Diameters of 20-30 μm are expected to mimic those in natural down. For some applications where weight savings is important, by selecting relatively high diameters, the fibers will add unnecessary weight to the insulation. On the other hand, by selecting relatively low diameters, the fiber may not be sufficiently stiff to provide the necessary loft and recovery.

In some representative embodiments, the secondary fibers branching off a primary fiber may have a diameter of 0.5 μm to 100 μm, and more particularly diameters equal to or less than about 100 μm, 90 μm, 80 μm, 70 μm, 60 μm, 50 μm, 40 μm, 30 μm, 20 μm, 15 μm, 12 μm, 11 μm, 10 μm, 9 μm, 8 μm, 7 μm, 6 μm, 5 μm, 4 μm, 3 μm, 2 μm, 1 μm or 0.5 μm are contemplated. Where any fiber has a non-uniform diameter, the diameter may generally be considered the average diameter, taking a statistical sampling of diameters along the fiber length. Diameters of 1 μm-3 μm are expected to mimic those of the secondary structures in natural down. If diameters are below 1-3 μm or thereabout, the fibers may not be as effective at stopping radiant heat loss but we have included nano-sized fiber for the purpose of trapping air space and reducing convective currents. If diameters are above 12 μm or thereabout, the insulation's warmth to weight ratio may be less than optimal. However good commercial insulations have been made with fiber diameters up to 25 μm and higher (e.g., Primaloft™ insulation), so a structure with 25 μm or thereabout fibers may still be suitable in some applications.

The inventive subject matter is not necessarily limited to any given dimensions or ratios of dimensions or other metrics specifically recited, and numbers and values above or below and in between values, limits or ranges may apply. Denier of the primary or secondary fibers may be 6D or less.

The ratio of the diameters of the primary fiber to the diameter of the secondary fiber, if any, (the "aspect ratio") may vary. Suitable ratios include from 1:1 to 100:1 or thereabout. Ratios of 6:1 to 30:1 or thereabout may mimic those of natural down. As noted above, the aspect ratio may also be less than one, particularly if the primary fiber is made from a material of higher strength properties than the material for the secondary fiber.

In some embodiments according to the inventive subject matter, a plurality of micron, submicron or nanometer dimension polymeric fibers are formed. The plurality of micron, submicron or nanometer dimension polymeric fibers may be of the same diameter or of different diameters.

In some embodiments according to the inventive subject matter, the methods of the invention result in the fabrication of micron, submicron or nanometer dimensions. For example, it is believed possible to fabricate polymeric fibers having diameters (or similar cross-sectional dimension for non-circular shapes) of about 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 nanometers, or 0.5, 1, 2, 5, 10, 20, 30, 40, 50, 60, 70, 80, 90, 100 or more micrometers. Sizes and ranges intermediate to the recited diameters are also part of the inventive subject matter.

The polymeric fibers formed using the methods and devices of the invention may be of a range of lengths based on aspect ratios of equal to or greater than 1, 10, 20, 30, 40, 50, 60, 70, 80, 90, 100, 500, 1000, 5000 or higher relative to the foregoing fiber diameters. In one embodiment, the length of the polymeric fibers is dependent at least in part, on the length of time the device is rotated or oscillated and/or the amount of polymer fed into the system. For example, it is believed that the polymeric fibers may be formed having lengths before or after segmentation of at least 0.5 micrometer, including lengths in the range of about 0.5 micrometers to 10 meters, or more. Additionally, the polymeric fibers may be cut to a desired length using any suitable instrument. Sizes and ranges intermediate to the recited lengths are also part of the inventive subject matter.

A wide variety of materials (synthetic, natural, bio-based-plants, bio-based-fermented) and fabric/substrate types (knits, wovens, and nonwovens) are contemplated for use in the inventive constructs. Non-limiting examples of fiber types that may be used in the inventive constructs include natural and synthetic polymers, polymer blends, and other fiber-forming materials. Polymers and other fiber-forming materials may include biomaterials (e.g., biodegradable and bioreabsorbable materials, plant-based biopolymers, bio-based fermented polymers), metals, metallic alloys, ceramics, composites and carbon superfine fibers.

Fiber collections may include a blending of multiple materials, as indicated above. Superfine fibers may also include single or multiple lumens. They may also have surface features such as pits or pores. Multi-lumen fibers may be achieved by designing, for example, one or more outlet ports with concentric openings. In certain embodiments, such openings may comprise split openings (i.e. an opening that possesses one or more dividers such that two or more smaller openings are made). Such features may be utilized to attain specific physical properties. For instance, the fibers may be produced for use as thermal insulation, such as in the insulation applications described below, or for use as elastic (resilience) or inelastic force attenuators.

In certain embodiments, fibrous webs of the present disclosure may include elastic fibers, such as polyurethane and polyacrylate based polymers, to impart stretchability to constructs according to the inventive subject matter.

The fibers in a discrete element may be of substantially the same deniers or they may be a blend of deniers. In either case, a suitable range for many applications is 1-6 denier or thereabout. In apparel applications, a suitable range may be 1-3 denier or thereabout.

Fiber-forming methods that may be adapted for use in creating such relative movement include electrospinning, meltblowing, meltspinning, forcespinning, or other methods In any of the foregoing embodiments, streams of directionally controlled or pulsed air or other gas could be used to help draw the secondary fiber, if any, and arrange it on the primary fiber. Heating of the streams may facilitate the drawing and bonding process. The one or more exit ports for the gas may be disposed at desired positions adjacent an exit port for the fiber-forming material. The gas exit port may also be in the nature of a whole or partial ring around the exit port of the flowable material.

The extruded or ejected or drawn composite structures of filamentous materials created by any of the processes contemplated herein may be cut, broken, severed, and otherwise segmented to desired, staple lengths. The fibers may be segmented by mechanical cutting means, laser energy, thermal energy, ultrasonic energy, and any other known or to be discovered ways of segmentation of physical structures. An example of mechanical cutting includes a simple guillotine or rotary cutting blade, as is well known in the industry to produce short lengths of cut staple fiber. Suitable lengths may be from 0.1 mm-5 cm or thereabout, as well as other lengths contemplated elsewhere herein. Suitable lengths to mimic natural down primary structures are from 5 mm-70 mm or thereabout, or 3-33 mm or thereabout, or 14 mm-20 mm or thereabout, as indicated elsewhere. If the segments are too small, the fibers may not loft. If they are too long, they may permanently entangle.

The fibers in any of the embodiments may include functional particles such as, but not limited to, antimicrobials, metals, flame retardants, anti-static, water repellents and ceramics. These materials may be introduced into the fiber-forming material. They may bond to the material covalently, by hydrogen bonds, ionic bonds or van der Waals forces, for example. A catalyst may be included in the material mixture to facilitate any such bonding.

In certain embodiments of the inventive subject matter, a flowable, fiber-forming material may be a mixture of two or more polymers and/or two or more copolymers. In other embodiments, the fiber-forming material polymers may be a mixture of one or more polymers and or more copolymers. In other embodiments, the fiber-forming material may be a mixture of one or more synthetic polymers and one or more naturally occurring polymers.

In some embodiments according to the inventive subject matter, the fiber-forming material is fed into a reservoir as a polymer solution, i.e., a polymer dissolved in an appropriate solution. In this embodiment, the methods may further comprise dissolving the polymer in a solvent prior to feeding the polymer into the reservoir. In other embodiments, the polymer is fed into the reservoir as a polymer melt. In such embodiment, the reservoir is heated at a temperature suitable for melting the polymer, e.g., is heated at a temperature of about 100° C. to about 300° C.

In one possible embodiment, a spinneret used in fiber formation can have multiple orifices where each orifice can has a different diameter to create a range of nanofibers and micron size fibers on the same spinneret. The orifices can be arranged in the same plane or out of plane to facilitate the wrapping of different smaller fibers around larger fibers during the rotation of the spinneret. The overall composite structure of the units of primary and secondary fibers should have a low density of equal to or less than 1% or thereabout of the filling volume.

Polyester fibers are but one possible example of a starting material for use in the discrete elements 1 of fill material disclosed or contemplated herein, particularly those that are intended to mimic natural down. Other synthetic or natural materials for one or both of the primary and secondary structures include: polyester (ethylene terephthalate), polyolefins (polypropylene and polyethylene, or their co-polymers). The materials could also be any other synthetic fiber that is presently used in meltblowing (or electrospinning if an electrospinning process is used). Examples include: other polyesters, e.g. poly(trimethylene terephthalate) (Sorona™), polyamides (e.g. Nylon), poly(methyl methacrylate) (Acrylic), poly (acrylonitrile), ethylene acrylic copolymers, polystyrene, polytetrafluroethylene (PTFE), ethylenechlorotrifuoroethylene (ECTFE), polyurethanes, polycarbonates, pitch, beta-lactam and blends of two or more of the above.

As noted, the primary and secondary fibers might be made from different materials, but polyester is one example of a suitable material for both.

For some performance insulation applications, factors affecting fiber selection may include:

Young's modulus—should be much higher than ~10 MPa

Yield strain—should be as high as possible, at least 1%, and preferably more than 10%

Coefficient of friction should ideally be anisotropic, in that when the insulation is compressed the friction should be high, and when allowed to re-loft the friction should be low (down achieves this using its tertiary structures)

Hydrophobic fibers are highly preferred to make the insulation resistant to moisture As well as surface hydrophobicity, the fibers should be generally resistant to moisture, and their mechanical properties should not change when wet Low bulk density of equal to or less than 30 kg/m$^3$ or thereabout once the yarns are filled into a compartment. Natural down is about 10 kg/m3, once packed into a compartment. Heavier insulation of 20-30 kg/m$^3$ or thereabouts is a specific range that is within the scope of the invention. (The bulk density of individual, unpacked yarns may not be a meaningful number in itself, as they may be a planar structure, and they may interpenetrate to some degree when they are packed into a compartment, and with a sufficiently low bulk density that the fiber units may avoid entangling with themselves.)

The fill power of natural goose down is an indicator of two important features: warmth-to-weight ratio and compressibility, both critical to retain warmth and furnish comfort. True fill power is measured by placing one ounce of goose down in a graduated cylinder and measuring the volume the down occupies in cubic inches. It is believed that the insulative materials made according to embodiments of the inventive subject matter are capable of rivaling goose down and providing 550 to 900 fill power, or thereabout, similar to goose down.

As used herein in connection with fiber dimensions, "diameter" means the diameter of a circular cross-section, in the strict sense of the word "diameter", and for fibers that have non-circular cross-sections, e.g., ovals and polygons, diameter means the non-circular fiber has a cross-sectional area that corresponds to a circular cross-section that gives the same cross-sectional area. In the case of fibers that do not have uniform diameters or cross-sectional areas along the length, an average for the length of a filament may be used. (Averages may also be used for other non-uniform structural or material parameters pertaining to this specification.)

The basic constructs described above may serve as substrate for assembly or integration with other materials. It may be produced as a continuous length of material. It could be from 0.1 meters to a kilometer or more long. It could be from 0.01 meter wide to many meters wide. Such dimensions are only limited by the state of the art for textile production. The construct may or may not additional have baffling or subdivision of a main compartment. Any such compartmentalization can be formed at time of assembly into a finished product or be preformed in the construct.

One possibility is to assemble additional layers of pliable sheet material, e.g., a fabric, to a construct 10. In garment and other applications, the additional layer may be a heavier weight or more durable fabric that serves as an outer shell. Other additional materials could include a comfort liner for the inside of a garment or a film or membrane that serves to provide water resistance, waterproofness, and/or breathability.

The textiles usable in the inventive subject matter may be made from any suitable material, including synthetic materials (e.g., polyester, nylon), natural materials (e.g., cotton or wool), or combinations thereof. Fabrics may be joined together by sewing, stitching, seamless weaving or knitting, adhesive bonding, melting or welding or any other known technique for fixing pieces of fabric together. As noted, constructs of the inventive subject matter can be used in a variety of fabric articles. It is particularly directed to certain articles incorporating the insulation or cushioning constructs. The constructs include any range of articles where such constructs may be used, including in garments and apparel, e.g., insulated jackets and pants; gloves; footwear, e.g., shoes and socks; headwear, e.g., parka hoods and other insulated hats, and facemasks; outdoor equipment, e.g., sleeping bags and shells for sleeping bags, blankets, tents, tarps and other covers; bedding, pillows, cushions, upholstery, or other fabric and non-fabric articles that can benefit from thermal insulation or cushioning.

In general, such products consist of a predetermined amount of fill material localized according to the teachings herein that is integrated into any article that has a plurality of walls that are connected through stitching, knitting, weaving, gluing, taping, fusion bonded, or other known or discovered means of sealing textile or fabric materials. The compartment or volumetric space in an article, such as a garment or sleeping bag, which is fillable or integrated with an inventive construct may be any desired size. For many applications contemplated herein, it may vary according to particular requirements. For example, for thermal insulation, 11 grams per square foot, of textile is an effective amount for jackets when using the loose PrimaLoft™ fill detailed above and a corresponding amount be used in an inventive construct contemplated herein.

FIG. 2 shows a representative product, namely a parka 24 with a plurality of regions integrating constructs 10 throughout the body, extremity and hood portions with integrated insulative constructs according to the inventive subject matter. The garment may have a compartment with an outer-facing wall that is a durable material, e.g. ripstop (e.g., Cordura™) nylon, and an inner wall (body facing) that is a finer or more comfortable material, such as polyester, fleece, cotton, or merino wool. Another layer may be laminated to the outer and/or inner layers. For example, a barrier layer of a waterproof, breathable membrane material such as expanded PTFE (e.g., Gore-Tex brand PTFE) may be laminated to the inner or outer layer. Other possible layers include hydrophilic layers to wick moisture or other functional layers. Any wall or layer may also be made using elastic materials such as elastane or polyurethane yarns.

Advantageously, unlike down-fill processes, the inventive constructs, due to their sheet structures, may be formed and/or used in a continuous process, such as on a conveyor system. They may also be spooled and rolled for use in conventional fabric and textile processes, as generally indicated by the roll and spool assembly 22 in FIG. 4.

Persons skilled in the art will recognize that many modifications and variations are possible in the details, materials, and arrangements of the parts and actions which have been described and illustrated in order to explain the nature of the inventive subject matter, and that such modifications and variations do not depart from the spirit and scope of the teachings and claims contained therein.

All patent and non-patent literature cited herein is hereby incorporated by references in its entirety for all purposes.

As used herein, "and/or" means "and" or "or", as well as "and" and "or." Moreover, any and all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more".

All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed as "a means plus function" claim under US patent law, unless the element is expressly recited using the phrase "means for" or "step for".

The invention claimed is:

1. A construct, comprising:
    a plurality of discrete elements comprising an agglomeration of fibers, the discrete elements arranged in a pliable sheet-like structure;
    the discrete elements being associated with each other in the sheet-like structure by lengths of first interconnecting fibers that engage the discrete elements to help immobilize them in place relative to one another to maintain the sheet-like structure, wherein, for a respective discrete element, the first interconnecting fibers comprise engaged fibers from discrete elements adjacent to the respective discrete element that are sufficiently engaged with fibers of the respective discrete elements so as to help immobilize the discrete elements in the sheet-like structure; and
    a first sheet material that is adjacent to the sheet-like structure of discrete elements, wherein the first sheet material is a non-woven web or scrim comprising a textile of fibers of about 0.5 to about 75 Denier supporting the discrete elements wherein the discrete elements interconnect with the first sheet material via second interconnecting fibers, each of the second interconnecting fibers comprising a first fiber portion emanating from a discrete element and a second fiber portion emanating from the supporting first sheet material that is adjacent to the sheet-like structure of discrete elements.

2. The construct of claim 1 wherein the first or second interconnecting fibers comprise fused fibers.

3. The construct of claim 2 wherein the agglomerated fibers comprise fibers having secondary structures.

4. The construct of claim 2 wherein the fused fibers comprise a polyester.

5. The construct of claim 1 wherein the first sheet material comprises fusible fibers.

6. The construct of claim 1 wherein the second interconnecting fibers comprise a plurality of neighboring piles that extends from the supporting first sheet material into the arrangement of discrete elements, the piles blocking, entangling, and/or fusing with the discrete fibers to help immobilize them in place relative to the supporting first sheet material, the piles being discrete structures from the fibers forming the discrete elements and the fibers forming the first sheet material.

7. The construct of claim 6 further comprising a second sheet of material opposite the first sheet material, the discrete elements being disposed therebetween.

8. The construct of claim 7 wherein one of: the plurality of interconnecting piles or a different second plurality of interconnecting piles extend from the second sheet material into the arrangement of discrete elements, the interconnecting piles that extend from the second sheet material blocking, entangling, and/or fusing with the fibers on the discrete elements to help immobilize them in place relative to the first and second sheet materials, the piles extending from the second sheet being discrete structures from the fibers forming the discrete elements and the fibers forming the second sheet material.

9. The construct of claim 1 further comprising a second sheet of material opposite the first sheet of material, the discrete elements being disposed therebetween, the first sheet having properties different from the properties of the second sheet of material, the properties differing in terms of one more of breathability, insulativeness, and wear resistance, the second sheet comprising a knit or woven textile material.

10. The construct of claim 9 wherein the construct comprises a plurality of baffled, integrated compartments, the first sheet material being on a first side of the compartments and the second sheet material being on a second, opposite side of the compartments.

11. The construct of claim 10 wherein the lengths of the second interconnecting fibers comprise fibers forming part of the first sheet material and fibers forming parts of the discrete elements, the fibers from the first sheet material and the fibers from the discrete elements being fused together at one or more points.

12. A construct, comprising:
a first pliable sheet material spaced-apart and opposite to a second pliable sheet material, the space between the sheet materials providing a volume for receiving a loose fill material;
a plurality of piles projecting into the volume of the space, each having a first end fixedly associated with the first sheet material and/or a second end fixedly associated with the second sheet material, the piles being transversely oriented to the first and second sheets of material; and
a loose fill material comprising discrete elements disposed in the volume around the piles.

13. The construct of claim 1, wherein a plurality of the constructs are integrally formed together in a baffled construction.

14. The construct of claim 12 wherein the piles are oriented transversely to the first and second sheets of materials.

15. The construct of claim 1 further comprising a supplemental layer of textile or a membrane coextensively joined to the first sheet material.

16. The construct of claim 15 wherein the supplemental layer comprises a heavier textile than the first sheet material.

17. The construct of claim 1 wherein the construct comprises an item of apparel, a sleeping bag, a comforter, pillow, or a pad or cushion.

18. The construct of claim 1 wherein the second interconnecting fibers are at least 1 DPF.

19. A method of making a construct, comprising:
providing a first layer of a pliable textile sheet material, wherein the sheet material comprises a non-woven web or scrim comprising a textile of fibers of about 0.5 to about 75 Denier;
placing a plurality of discrete elements comprising an agglomeration of fibers on the pliable sheet material, at least some of the fibers comprising fusible fibers;
causing the fusible fibers to fuse so that the discrete elements are associated with at least the sheet material by lengths of first interconnecting fused fibers that immobilize the discrete elements relative to the sheet material and providing for the discrete elements to retain at least 50% of their general volumetric or topological form following the fusion; and
wherein the discrete elements interconnect with the sheet material via second interconnecting fibers, each of the second interconnecting fibers comprising a first fiber portion emanating from a discrete element and a second fiber portion emanating from the sheet material.

20. The construct of claim 12, wherein the piles comprise filaments.

* * * * *